US012536057B2

(12) United States Patent
Allan

(10) Patent No.: US 12,536,057 B2
(45) Date of Patent: Jan. 27, 2026

(54) SCATTER-GATHER ATOMIC OPTIMIZATION

(71) Applicant: ADVANCED MICRO DEVICES, INC., Santa Clara, CA (US)

(72) Inventor: Jeffrey C. Allan, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 876 days.

(21) Appl. No.: 17/563,262

(22) Filed: Dec. 28, 2021

(65) Prior Publication Data

US 2023/0205609 A1 Jun. 29, 2023

(51) Int. Cl.
*G06F 9/52* (2006.01)
*G06F 12/0811* (2016.01)

(52) U.S. Cl.
CPC .......... *G06F 9/526* (2013.01); *G06F 12/0811* (2013.01)

(58) Field of Classification Search
None
See application file for complete search history.

(56) References Cited

U.S. PATENT DOCUMENTS

2006/0047917 A1* 3/2006 Godin ............... G06F 9/526
711/146
2013/0166855 A1* 6/2013 Batwara ............ G06F 12/0802
711/154

* cited by examiner

*Primary Examiner* — Eric C Wai

(57) ABSTRACT

In response to receiving a request for an atomic operation on a first element of a vector comprising a first address and a first data value, a processing system determines a request history associated with the first element. The processing system selectively alters the first request, based on the request history and the first data value.

18 Claims, 5 Drawing Sheets

SCATTER-GATHER ATOMIC OPTIMIZATION

BACKGROUND

Scatter-gather techniques are currently used in many computing contexts. For example, computer vision applications store data for pixels of a curved line in non-contiguous storage in a memory (e.g., dynamic random access memory (DRAM)). Scatter-gather techniques provide low-level access to such data that is scattered throughout DRAM, treating it as contiguously stored data. For example, the non-contiguous storage is accessed to generate a vector of elements that each store an address and a data value. The vector, or portions of the vector, are then processed in fewer cycles than processing based on memory access for each element (e.g., pixel). Once the vector processing is complete, the resulting elements, if modified, are written back to their respective addresses in memory, or are cached for future accesses.

Atomic operations are widely used in multi-threaded programming models for synchronization and communication collectives. Within processing systems including multiple processing devices, enforcing atomicity for memory operations is useful in some contexts to reduce errors and provide memory security. Atomicity refers to indivisibility of an operation—either the operation is performed in full or not at all. To enforce the atomicity of an atomic memory operation, coherency across a scope indicated by the atomic memory operation is maintained using certain coherency operations performed within the processing system. In high-performance computing and machine learning applications, atomic operations are used for atomic addition and increments where a new value is added to an old value in memory. Such operations are conventionally executed at the target in local memory. However, conventional atomic operations on vectors induce significant overhead in terms of processing resources.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
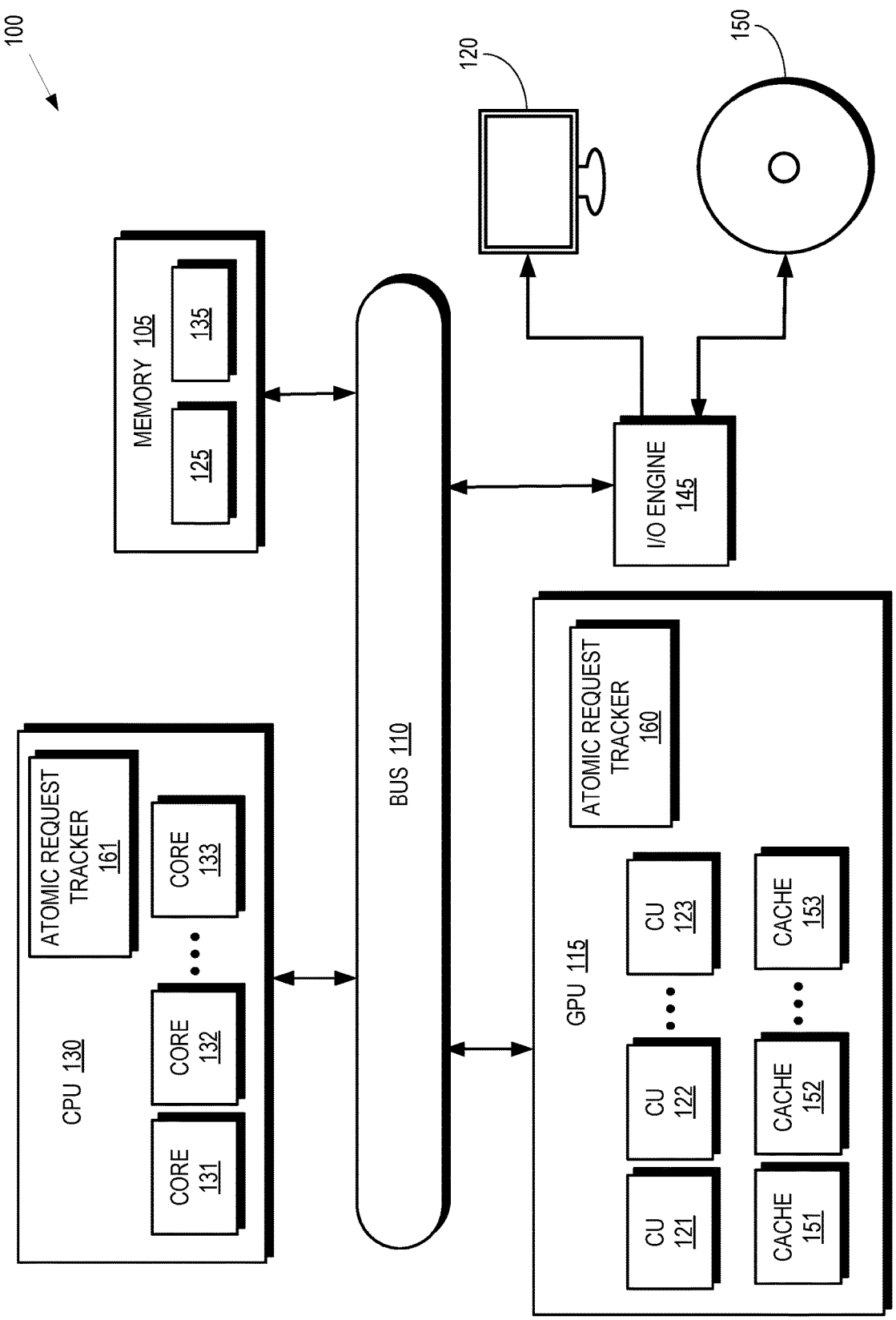
FIG. 1 is a block diagram of a multi-core processing system including an atomic request tracker to resolve atomic operations on vectors, in accordance with some embodiments.

In some processing environments, processors executing vector-based memory requests use multiple lanes of a bus to request the same vector element across multiple cycles. Conventionally, in response to a request for an atomic operation, a processor performs the atomic operation (e.g., an arithmetic-logic unit (ALU) operation) for each vector element in memory. If multiple lanes request the same element, the atomic operation is resolved for each lane individually. Some conventional processing systems use a store combining buffer (SCB) to resolve the atomic operations before writing data stored at the SCB back to a cache of the processor. Thus, the result of each vector element request is determined and saved in the SCB so that store operations for the results can be combined into a single larger transaction before storing the results in the cache. However, processing using the SCB complicates lookup and cache read/write logic to account for results of atomic operations that are stored at the SCB but not yet stored in cache and increases latency. For example, in order to utilize the SCB, the processor performs a write-back that is desynchronized from the original request.

FIGS. 1-5 illustrate techniques for collapsing requested atomic operations by tracking vector elements and killing or overwriting some tracked elements to reduce overlapping requests and eliminate duplicative or unnecessary memory accesses for the requested atomic operations. In response to a request for an atomic operation on elements of a vector, a hardware atomic request tracker (referred to herein as a "tracker" or "atomic request tracker") alters or eliminates the request based on a history of prior requests to the requested element prior to access of the elements at a first level cache. The tracker tracks the address and data of a requested element on the first atomic request to the element. In response to a subsequent atomic request to the element, the tracker kills or overwrites the element based on the relationship of the data for the first atomic request and the subsequent atomic request.

The tracker kills the subsequent atomic request if the subsequent atomic request cannot have an impact on memory due to the first atomic request's data. For example, if the atomic operation is an OR operation and the bits set in the subsequent atomic request are a subset of the bits in the first atomic request, the tracker determines that the subsequent atomic request will not result in a different value being stored in memory and the tracker kills the subsequent atomic request. Similarly, if the atomic operation is a MIN operation and the subsequent atomic request is larger than the first atomic request, the tracker determines that the subsequent atomic request will not result in a different value being stored in memory and kills the subsequent atomic request.

The tracker alters the subsequent atomic request by performing an overwrite element alteration if the subsequent atomic request can have an impact on memory. For example, if the atomic operation is an atomic OR with different bits set between the first atomic request and the subsequent atomic request, the tracker updates the value of the data with the resulting OR operation between the first atomic request and the subsequent atomic request.

In some embodiments, if the number of elements exceeds a capacity of the tracker and an overlapping request is received for a non-tracked element, the tracker triggers a force-miss. The force-miss isolates the overlapping request from any previous requests, preventing an overwrite on the previous request.

Example techniques discussed herein reduce the number of memory accesses for performing the particular atomic operations. In some embodiments, the number of tracked elements is finite, and is processed using only a small amount of storage for each tracker (e.g., storage for 4 addresses and 4 data values, for 4 vector elements). In some embodiments, a processor utilizes a "dirty-mask" to detect when a non-tracked element is accessed multiple times, triggering a "force-miss" to prevent requests from triggering an "overwrite element" behavior. First time requests which are added to trackers continue to flow through the pipeline untouched (i.e., bypassing processing). Further, if no collapsible requests are received, no write-back is performed. Because memory accesses and system traffic are reduced, the optimizing technique consumes substantially less system resources and power, with increased speed in performing atomic operations on vectors.

FIG. 1 is a block diagram of a processing system 100 that selectively collapses requested atomic operations using trackers for vector elements by selectively killing or overwriting tracked elements according to some embodiments. The processing system 100 includes or has access to a memory 105 or other storage component that is implemented using a non-transitory computer-readable medium such as a dynamic random-access memory (DRAM). However, in some cases, the memory 105 is implemented using other types of memory including static random-access memory (SRAM), nonvolatile RAM, and the like. The memory 105 is referred to as an external memory since it is implemented external to the processing units implemented in the processing system 100. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The techniques described herein are, in different embodiments, employed at any of a variety of parallel processors (e.g., vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like). FIG. 1 illustrates an example of a parallel processor, and in particular a graphics processing unit (GPU) 115, in accordance with some embodiments. The graphics processing unit (GPU) 115 renders images for presentation on a display 120. For example, the GPU 115 renders objects to produce values of pixels that are provided to the display 120, which uses the pixel values to display an image that represents the rendered objects. The GPU 115 implements a plurality of compute units (CU) 121, 122, 123 (collectively referred to herein as "the compute units 121-123") that execute instructions concurrently or in parallel. In some embodiments, the compute units 121-123 include one or more single-instruction-multiple-data (SIMD) units and the compute units 121-123 are aggregated into workgroup processors, and the like. The number of compute units 121-123 implemented in the GPU 115 is a matter of design choice and some embodiments of the GPU 115 include more or fewer compute units than shown in FIG. 1. Some embodiments of the GPU 115 are used for general-purpose computing. The GPU 115 executes instructions such as program code 125 stored in the memory 105 and the GPU 115 stores information in the memory 105 such as the results of the executed instructions.

The processing system 100 also includes a central processing unit (CPU) 130 that is connected to the bus 110 and therefore communicates with the GPU 115 and the memory 105 via the bus 110. The CPU 130 implements a plurality of processor cores 131, 132, 133 (collectively referred to herein as "the processor cores 131-133") that execute instructions concurrently or in parallel. The number of processor cores 131-133 implemented in the CPU 130 is a matter of design choice and some embodiments include more or fewer processor cores than illustrated in FIG. 1. The processor cores 131-133 execute instructions such as program code 135 stored in the memory 105 and the CPU 130 stores information in the memory 105 such as the results of the executed instructions. The CPU 130 is also able to initiate graphics processing by issuing draw calls to the GPU 115. Some embodiments of the CPU 130 implement multiple processor cores (not shown in FIG. 1 in the interest of clarity) that execute instructions concurrently or in parallel. Similar to the GPU 115 discussed above, in some embodiments, the CPU 130 implements an atomic request tracker 161 to collapse some requested atomic operations using trackers for vector elements and kill or overwrite some tracked elements. Upon receipt of a request for a particular atomic operation for elements of a vector, the atomic request tracker 161 determines whether to collapse a particular element by using history and altering the current lookup instead of holding up the first lookups. The atomic request tracker 161 is shown in more detail in FIG. 2, discussed further below.

An input/output (I/O) engine 145 handles input or output operations associated with the display 120, as well as other elements of the processing system 100 such as keyboards, mice, printers, external disks, and the like. The I/O engine 145 is coupled to the bus 110 so that the I/O engine 145 communicates with the memory 105, the GPU 115, or the CPU 130. In the illustrated embodiment, the I/O engine 145 reads information stored on an external storage component 150, which is implemented using a non-transitory computer-readable medium such as a compact disk (CD), a digital video disc (DVD), and the like. The I/O engine 145 is also able to write information to the external storage component 150, such as the results of processing by the GPU 115 or the CPU 130.

In the illustrated embodiment, the compute units 121-123 in the GPU 115 include (or are associated with) one or more caches 151, 152, 153, which are collectively referred to herein as "the caches 151-153." The caches 151-153 can include an L0 cache, an L1 cache, an L2 cache, an L3 cache, or other caches. In some embodiments, the caches 151-153 are organized in a cache hierarchy (i.e., a multi-cache hierarchy) that includes faster, but relatively smaller, lower-level caches such as an L0 cache and slower, but relatively larger, higher-level caches such as an L3 cache. The lower-level caches are inclusive such that all data stored in the lower-level caches is also stored in a higher-level cache in some embodiments. Memory access requests are initially directed to the lowest level cache. If the request hits a cache line in the lowest level cache, data in the cache line is returned to the requested processing unit. If the request misses in the lower-level cache, the request is sent to the next higher-level cache. If the request hits a cache line in the higher-level cache, data in the higher-level cache is returned to the requesting processing unit. Otherwise, the request is sent to the next higher-level cache or the main memory 105. Data that is retrieved from a higher-level cache (or main memory) in response to a cache miss in a lower-level cache is also stored in a cache line of the lower-level cache. If the lower-level cache is full, one of the cache lines in the lower-level cache is evicted to make room for the new data.

Responsive to a request for an atomic operation on elements of a vector, a processor generally performs the atomic (ALU) operation for each element in memory. For multiple lanes requesting the same element, the atomic operation is resolved for each lane individually. If this memory read-modify-write (RMW) operation is performed outside the first level cache, any time multiple requests operate on a same element in memory the requests are serialized up the cache hierarchy. On the other hand, regular stores can collapse overlapping requests without prior knowledge of the underlying data in memory as it will be overwritten.

To facilitate resolution of atomic requests across request multiple lanes, the GPU 115 includes an atomic request tracker 160, to selectively collapse requested atomic operations using trackers for vector elements by selectively killing or overwriting tracked elements. Upon receipt of a request for a particular atomic operation for elements of a vector, the atomic request tracker 160 determines whether to collapse a particular element by using history (e.g., by using a tracker) and altering the current lookup instead of holding up the first lookups. For example, an alternative technique to tracking holds up the first lookup and waits to determine whether a future lookup will collapse with the first lookup. If the first lookup is unable to collapse with a future lookup, the first lookup is still processed, as it was held back (e.g., as in the conventional SCB technique discussed above). In contrast, tracking records the first lookup but still allows the lookup to be processed to the cache. In the event of a second lookup that is collapsible with the first, the second lookup uses the knowledge of the prior history to alter the second request. The atomic request tracker 160 is shown in more detail in FIG. 2, discussed further below. In some embodiments, the atomic request tracker 160 allows atomic operations to combine data in lower cache levels, similar to traditional writes, by adding a tracker and altering or eliminating requests.

In some embodiments, requests can also trigger a force-miss, when the number of tracker slots is filled and an overlapping request (i.e., a second request that overlaps a first request) is determined for a non-tracked element. The force-miss serves to isolate the request from any previous requests, thus preventing an overwrite operation on the previous request. Generally, a cache does not have more than one valid cache line using the same memory address. For example, if a lookup would hit on a first cache line, but a force-miss caused a second cache line to be used for the current lookup, the first cache line is marked invalid and resolved (i.e., via write-back to memory). No future requests hit on the first cache line, as the second cache line becomes the most up-to-date cache line at that memory address. Signaling force-miss serves to prevent any current requests from overwriting data in the first cacheline, which includes the previous requests.

Figure 2:
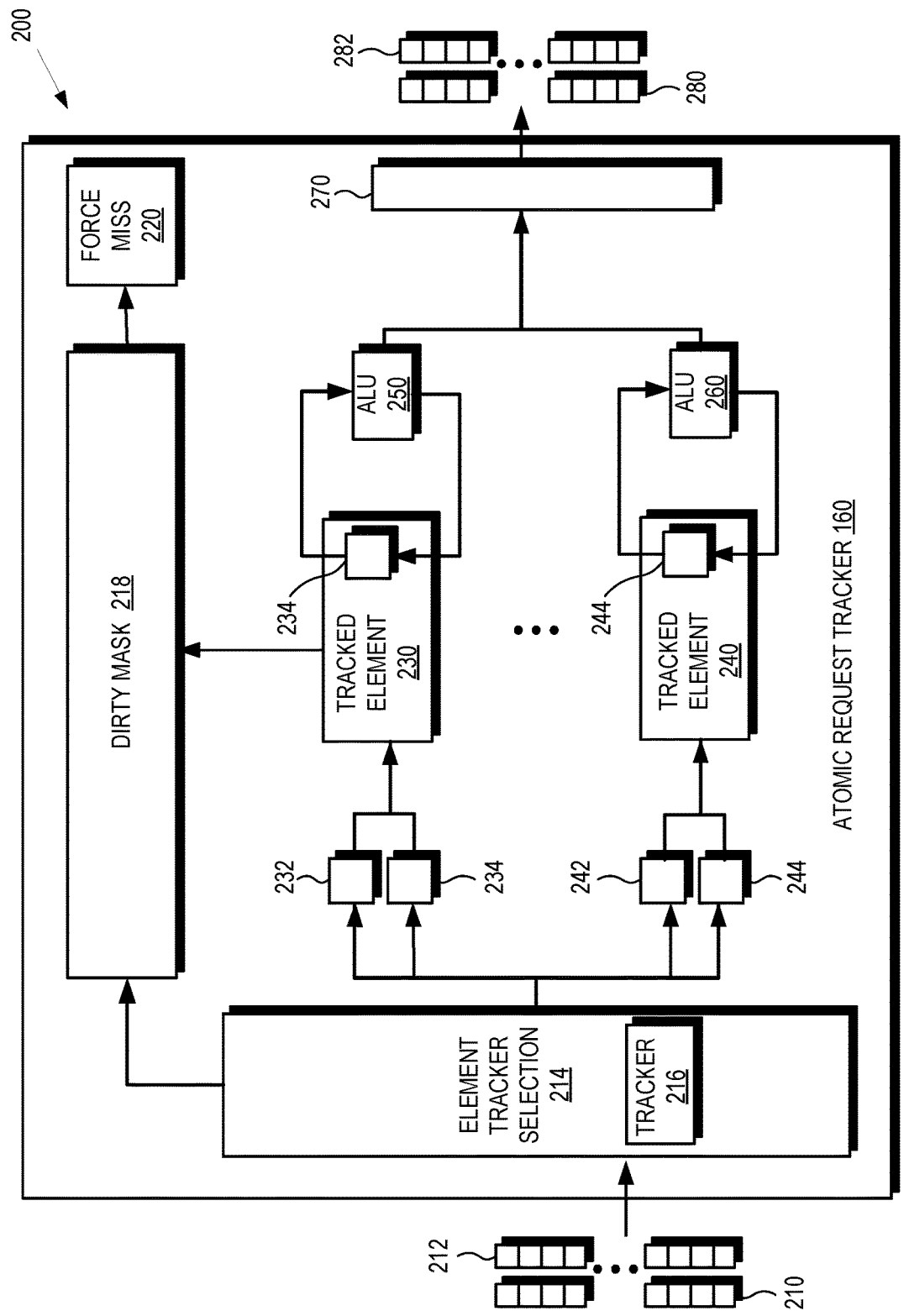
FIG. 2 is a block diagram of a portion of the processing system illustrating the atomic request tracker resolving atomic operations on vectors in accordance with some embodiments.

FIG. 2 is a block diagram of a portion 200 of the processing system 100 illustrating the atomic request tracker 160 resolving atomic operations on vectors in accordance with some embodiments. In the depicted example, the atomic request tracker 160 receives requests for atomic operations on vector elements, shown as pairs of addresses 210 and data values 212 for each element, as discussed above. An element tracker selection module 214 includes a tracker 216 to track a history of requests received at the atomic request tracker 160.

The element tracker selection module 214 outputs tracked elements 230, . . . , 240, each indicating a respective address and data value received from the element tracker selection module 214. In some embodiments, for each incoming request element, the element tracker selection module 214 first determines whether there is available storage space in the tracker 216 to store that particular request element. If there is no available space, that particular request element will not be tracked by the tracker 216, so the tracker 216 sends the information for the newly received request to the dirty mask 218, indicating untracked data (i.e., not tracked by the tracker 216), otherwise, the element tracker selection module 214 adds that particular request element to the tracker 216, indicating tracked information. The element tracker selection module 214 determines whether each incoming request element address 210 matches an address associated with an entry in the tracker 216. In response to determining that an incoming request element address 210 matches an address associated with an entry in the tracker 216, the element tracker selection module 214 provides the request element to at least one of the tracked elements 230, . . . , 240 whose address value matches the incoming request element address 210. The ALU 250, . . . , 260 processes the data values of the request element and the at least one of the tracked elements 230, . . . , 240 in accordance logic associated with the requested atomic operation (e.g., AND, OR, MIN, MAX, etc.).

In the depicted example, each arithmetic/logic unit (ALU) 250, . . . , 260 is shown providing output information to a kill/adjust requests module 270, which provides as output the kill/adjust results as output pairs of respective pairs of addresses 280 and corresponding data values 282. Each ALU 250, . . . , 260 performs the requested atomic operation on the respective data value 234, . . . , 244 for each tracked element 230, . . . , 240. Based on the tracked history of previous requests and the type of operation performed by the ALU 250, . . . , 260 (e.g., AND, OR, MIN, MAX, etc.), the kill/adjust requests module 270 determines the output of the requests to the kill/adjust requests module 270, the output having pairs of addresses 280 and data values 282. For example, for an incoming request for an atomic "OR" type of operation for a vector element, the kill/adjust requests module 270 determines that the new request will be killed (i.e., not performed to modify memory) if the tracked data value 234 is equal to the data value 212 of the new request. If the tracked data value 234 is not equal to the data value 212 of the new request, then the kill/adjust requests module 270 determines that the element will be overwritten with an "OR"ed result (determined by the ALU 250, . . . , 260) of the tracked data value 234 and the data value 210.

The element tracker selection module 214 determines whether a first received request has an associated tracked history, by accessing the tracker 216. In some embodiments, the tracker 216 stores, at least, the pairs of request addresses 210 and request data values 212 for each element, as the associated requests are received for processing the associated element. In some embodiments, if the tracker 216 is determined to have no available space for tracking a newly received request, the tracker 216 sends the information for the newly received request to the dirty mask 218, indicating untracked data. In some embodiments, the atomic request tracker 160 utilizes the dirty mask 218 to detect when a non-tracked element is accessed multiple times, triggering the force-miss 220 signal to prevent requests from triggering an "overwrite element" behavior (i.e., to prevent overwrites on the non-tracked element, which would otherwise be treated differently from tracked elements). First time requests which are added to trackers 216 continue to flow through the pipeline untouched. Further, if no collapsible requests are received, no write-back is performed.

In some embodiments, the atomic request tracker 160 provides atomic operations to combined data in lower cache levels, similar to traditional writes, by adding a tracker (i.e., the tracker 216) and altering or eliminating requests.

In some embodiments, the atomic request tracker 160 utilizes the tracker 216 prior to the first level cache to alter and sometimes eliminate an atomic request by using the knowledge of prior requests recorded to the same element. The first level cache can collapse these requests similar to traditional writes using a last thread to write wins scenario (i.e., the last value written, in time, is the final value). The request manipulation ensures the atomic operation will result in the same value in memory but with fewer requests through the memory hierarchy. The tracker 216 tracks the address 232 and data 234 of a requested element on the first atomic access of that element. Any sequential atomic requests to that element can be overwritten or killed depending on the relationship of the data for the two accesses.

In some embodiments, requests are killed when a request will not have an impact on memory (e.g., the request will not change a value stored in memory) due to the data of a prior request. For example, an atomic OR operation where the bits set in a second request are a subset of the bits in a prior request will not change a value stored in memory due to the data of a prior request. An atomic AND operation has similar results. The processing logic is indicated symbolically as:
Operation: OR
  Overwrite element with (Track-data | current-data)
  Kill if (tracked-data==current-data)
Operation: AND
  Overwrite element with (Track-data & current-data)
  Kill if (tracked-data==current-data)

Figure 3:
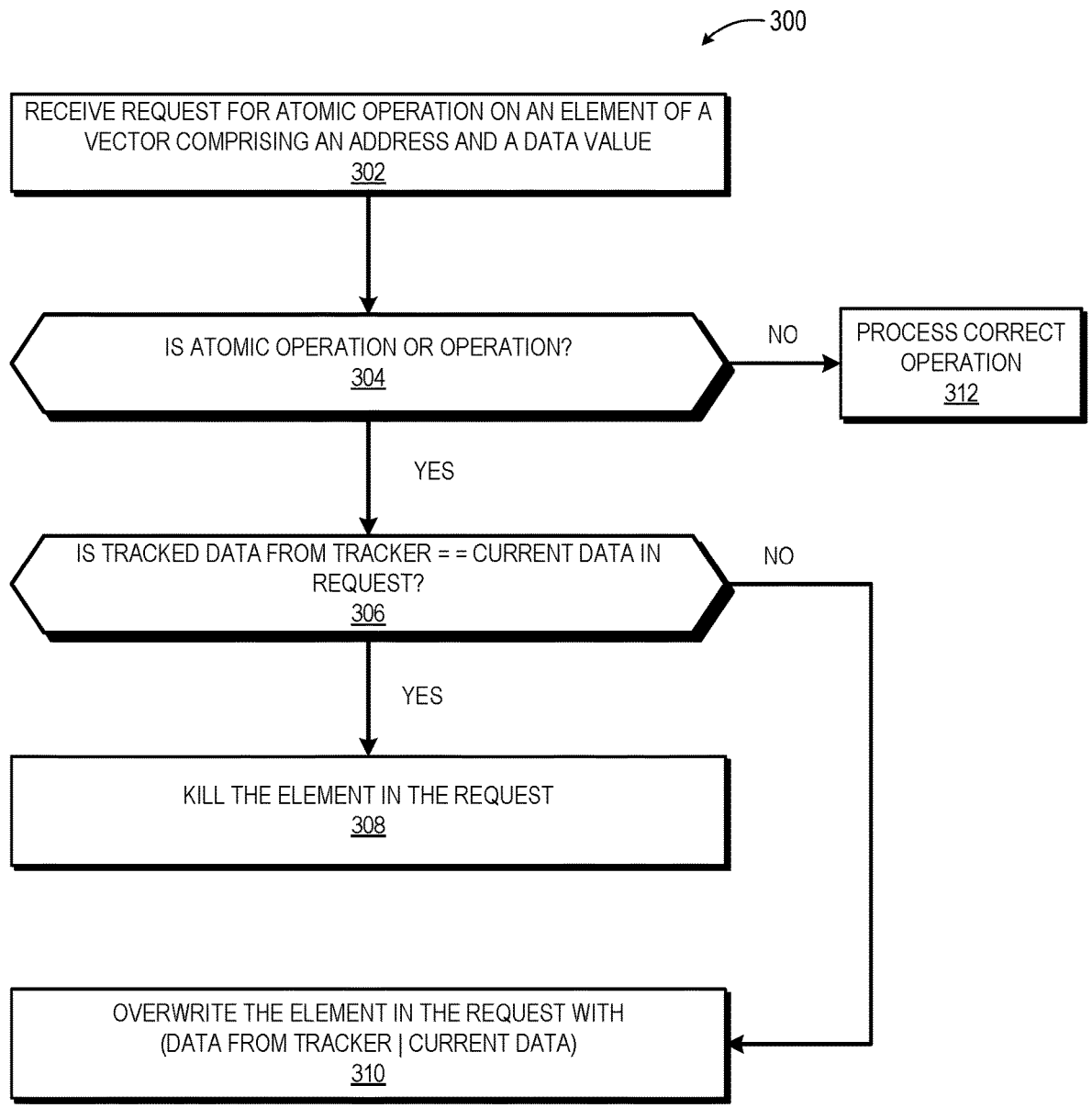
FIG. 3 is a flow diagram illustrating a method of resolving atomic operations on vectors for an OR operation in accordance with some embodiments.

FIG. 3 illustrates a method 300 of altering a requested atomic operation on an element of a vector, in accordance with some embodiments. At step 302, the atomic request tracker 160 of FIG. 2 receives a request for an atomic operation on an element of a vector comprising an address and a data value. At step 304, the atomic request tracker 160 of FIG. 2 determines whether the atomic operation is an OR operation, else the atomic request tracker 160 processes a correct operation, at step 312. If the atomic operation is an OR operation, at step 306, the ALU 250 determines whether tracked data from the tracker 216 is equal to the data value of the current request. If tracked data from the tracker 216 is equal to the data value of the current request, at step 308, the atomic request tracker 160 kills the element in the request (i.e., because the "OR" type of the operation is a commutative operation, that produces valid results without regard to ordering of a plurality of executions of the operations, and further, an "OR" on two or more equal data values fails to change any values in a result of the "OR"). If the tracked data is not equal to the data value of the current request, at step 310, the atomic request tracker 160 overwrites the element in the request with (Track-data | current-data) (i.e., because the "OR" type of the operation is a commutative operation), at step 310.

Figure 4:
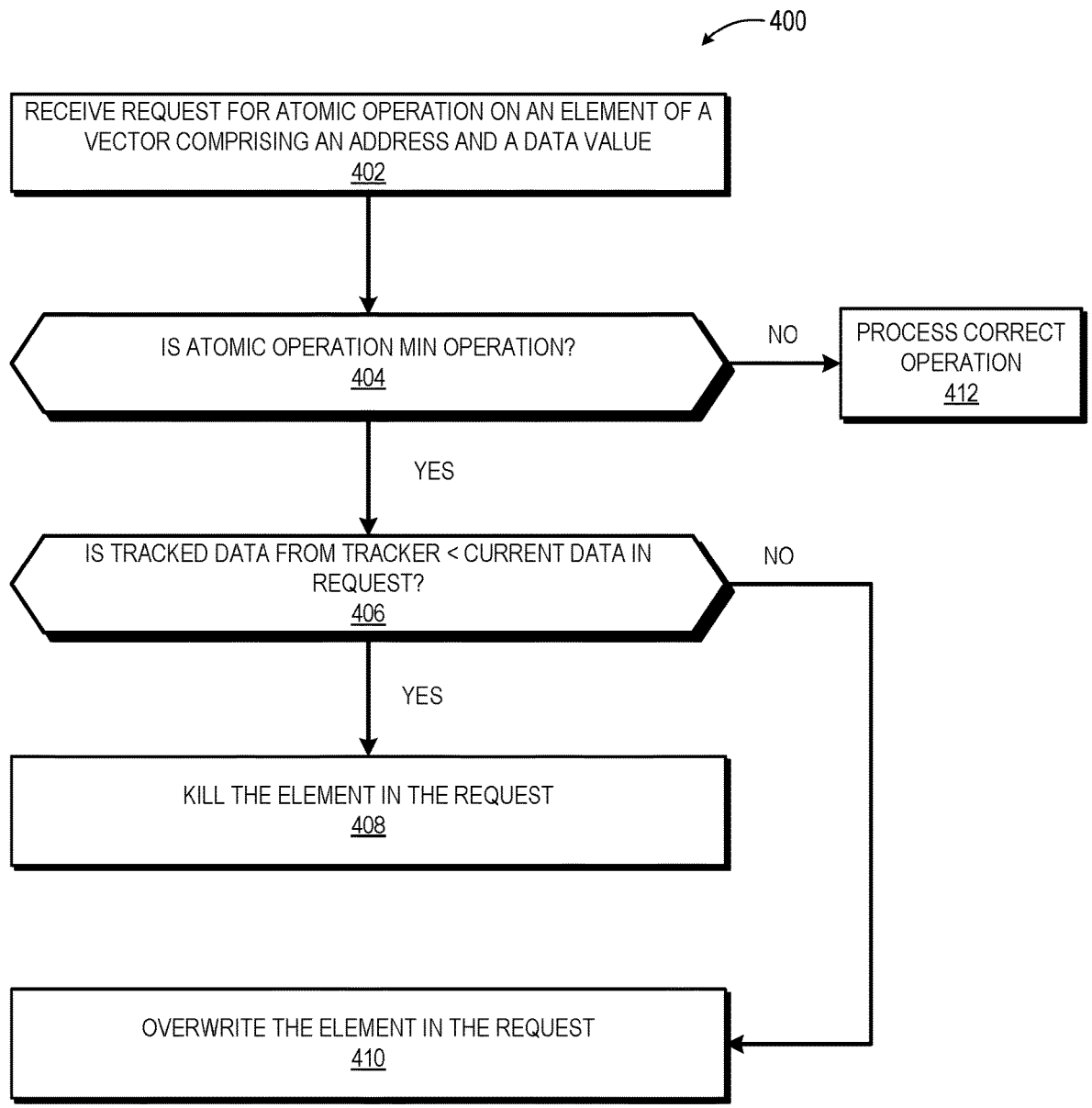
FIG. 4 is a flow diagram illustrating a method of resolving atomic operations on vectors for a MIN operation in accordance with some embodiments.

As another example, an atomic MIN operation where the data value of the second request is larger than the data value of the prior request will not have an impact on memory (i.e., the atomic MIN operation will not change a value stored in memory) due to the data of the prior request. An atomic MAX operation has similar results. In these examples, the result of the second atomic operation on memory fails to change the result regardless of the value in memory. The processing logic is indicated symbolically as:
Operation: MIN
  Tracked-data <current-data=>Kill element
  Tracked-data >current-data=>Overwrite element
Operation: MAX
  Tracked-data >current-data=>Kill element
  Tracked-data <current-data=>Overwrite element FIG. 4 illustrates a method 400 of altering a requested atomic operation on an element of a vector, in accordance with some embodiments. At step 402, the atomic request tracker 160 of FIG. 2 receives a request for an atomic operation on an element of a vector comprising an address and a data value. At step 404, the atomic request tracker 160 of FIG. 2 determines whether the atomic operation is a MIN operation, else the atomic request tracker 160 processes a correct operation, at step 412. If the atomic operation is a MIN operation, at step 406, the ALU 250 determines whether tracked data from the tracker 216 is less than the data value of the current request. If tracked data from the tracker 216 is less than the data value of the current request, at step 408, the atomic request tracker 160 kills the element in the request. If the tracked data is not less than the data value of the current request, at step 410, the atomic request tracker 160 overwrites the element in the request.

In some embodiments, requests are overwritten when the additional request can impact memory. In some atomic operations, the data is manipulated to account for the initial request. For example, for an atomic OR operation with different bits set between requests, the atomic request tracker 160 updates the data with the resulting OR operation between the two requests. The updated second request can then overwrite the first request via traditional write combined techniques.

In some embodiments, requests can also trigger a force-miss when the number of tracker slots is filled and an overlapping request is determined for a non-tracked element. The force-miss serves to isolate the request from any previous requests, thus preventing an overwrite on the previous request.

In some embodiments, atomic operations also support the ability to return the value in memory prior to the atomic operation being performed. This can be useful for semaphores or locks to communicate back to the program if the lock was available when the thread accessed the memory. Generally, a "lock" refers to a synchronization mechanism that enforces limits on access to a resource when there are multiple threads of execution. In cases where multiple lanes are requesting the same lock, only one lane has the possibility of obtaining the lock. In order to support returning the correct value, the killed definition is different from the overwritten definition. For example, requests are not killed, and requests that would have been previously killed are instead treated as overwritten. Thus, requests are overwritten when a request fails to have an impact on memory due to the data of the prior request. Additionally, overwritten requests return the value post-atomic operation instead of the pre-atomic operation of the original. In some embodiments, this is handled by a sequential dependent fetch, additional data return, or by resolving the atomic again. Further, requests which previously overwrote will trigger a force-miss. In some embodiments, requests which could impact memory are serialized by triggering a force-miss.

Figure 5:
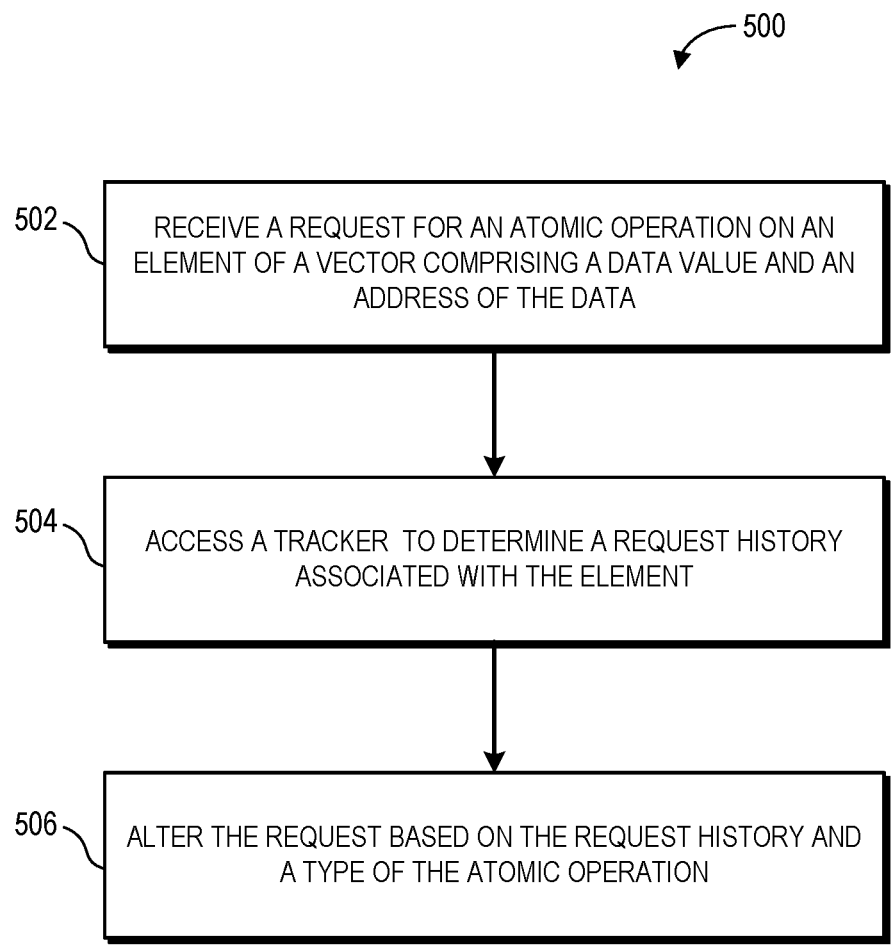
FIG. 5 is a flow diagram illustrating a method for resolving atomic operations on vectors in accordance with some embodiments.

FIG. 5 is a flow diagram illustrating a method 500 for resolving atomic operations on vectors in accordance with some embodiments. At block 502, an atomic request tracker receives a request for an atomic operation on an element of a vector comprising a data value and an address of the data. For example, the atomic request tracker 160 receives a request for an atomic operation on an element of a vector comprising a data value 212 and an address 210 of the data.

At block 504, the atomic request tracker accesses a tracker to determine a request history associated with the element.

For example, the atomic request tracker 160 accesses the tracker 216 to determine a request history associated with the element.

At block 506, the atomic request tracker selectively alters the request based on the request history and a type of the atomic operation. For example, the atomic request tracker 160 alters the request based on the request history and a type of the atomic operation. For example, the atomic request tracker 160 alters the request by one or more of killing, overwriting, or collapsing. For example, a type of the operation includes one or more commutative operations, that produce valid results without regard to ordering of a plurality of executions of the operations.

In some embodiments, the apparatus and techniques described above are implemented in a system including one or more integrated circuit (IC) devices (also referred to as integrated circuit packages or microchips), such as the atomic request tracker described above with reference to FIGS. 1-5. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   receiving, during execution of one or more processing threads, a request for an atomic operation on a first element of a vector comprising a first address and a first data value;
   responsive to the request, selectively altering the request via operation tracking circuitry based on the first data value and on a request history associated with the first element; and
   in response to determining that processing the atomic operation on the first data value would not change a value stored in memory at the first address, continuing the execution without processing the atomic operation.

2. The method of claim 1, wherein selectively altering the request comprises:
   in response to determining that the request history indicates no prior history associated with the first element, adding the first element to a tracker.

3. The method of claim 1, wherein selectively altering the request comprises:
   in response to the request history indicating a prior history associated with the first element, initiating a processing of the atomic operation on the first data value.

4. The method of claim 1, further comprising:
   collapsing the request with a prior request included in the request history associated with the first element.

5. The method of claim 1, wherein selectively altering the request comprises:
in response to a subsequent request for the atomic operation on the first data value and based on determining that the atomic operation changes a value stored in memory at the first address, initiating an overwrite of the first element at the first address.

6. The method of claim 1, wherein selectively altering the request comprises:
in response to determining that the request history fails to include the request, accessing a dirty mask to determine whether the first element has been accessed previously.

7. The method of claim 6, further comprising:
in response to determining that the first element has been accessed prior to receiving the request, initiating a force-miss signal to prevent a triggering of an overwrite operation.

8. A processing system comprising:
a processor;
a system memory;
atomic request tracker circuitry to, during execution by the processor of one or more processing threads:
in response to receiving a request for an atomic operation on a first element of a vector comprising a first address and a first data value, selectively alter the request based on a request history associated with the first element;
and on the first data value; and
in response to determining that processing the atomic operation on the first data value would not change a value stored in memory at the first address, continuing execution without processing the atomic operation.

9. The processing system of claim 8, wherein the atomic request tracker is further to:
in response to determining that the request history indicates no prior history associated with the first element, add the first element to a tracker.

10. The processing system of claim 8, wherein the atomic request tracker is further to:
in response to determining that the request history indicates a prior history associated with the first element, initiate processing of the atomic operation on the first data value.

11. The processing system of claim 8, wherein the atomic request tracker is further to:
collapse the request with a prior request included in the request history associated with the first element.

12. The processing system of claim 8, wherein the atomic request tracker is further to:
in response to a subsequent request for the atomic operation on the first data value and based on a determination that the atomic operation changes a value stored in memory at the first address, initiate an overwrite of the first element at the first address.

13. The processing system of claim 8, wherein the atomic request tracker is further to:
in response to determining that the request history fails to include the request, access a dirty mask to determine whether the first element has been accessed previously.

14. The processing system of claim 13, wherein the atomic request tracker is further to:
in response to determining that the first element has been accessed previously, initiate a force-miss signal to prevent a triggering of an overwrite operation.

15. A method comprising:
receiving, during execution of one or more processing threads and via operation tracking circuitry, a first request for an atomic operation on a first vector element comprising a first address and a first data value;
in response to receiving a second request for the atomic operation on a second vector element comprising a second address and a second data value, determining via the operation tracking circuitry that the second request will not modify a value stored at the first address responsive to the first request; and
based on the determining that the second request will not modify the stored value, selectively altering the second request and continuing execution without processing the atomic operation.

16. The method of claim 15, wherein selectively altering comprises:
collapsing the first request with the second request.

17. The method of claim 15, wherein selectively altering comprises:
initiating an overwrite of the first vector element at the first address.

18. The method of claim 15, further comprising:
adding the first request and the second request to a tracker.

* * * * *